United States Patent
tenThoren

(10) Patent No.: US 10,018,189 B1
(45) Date of Patent: Jul. 10, 2018

(54) WIND TURBINE TOWER CABLE POSITIONING DEVICE

(71) Applicant: General Electric Company, Schenectady, NY (US)

(72) Inventor: Rolf Reinfried tenThoren, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/627,595

(22) Filed: Jun. 20, 2017

(51) Int. Cl.
*F03D 80/80* (2016.01)
*H02G 3/34* (2006.01)

(52) U.S. Cl.
CPC ............... *F03D 80/85* (2016.05); *H02G 3/34* (2013.01); *F03D 80/82* (2016.05)

(58) Field of Classification Search
CPC ............ F03D 80/85; F03D 80/82; H02G 3/34
See application file for complete search history.

(56) References Cited

U.S. PATENT DOCUMENTS

| 8,366,396 B2* | 2/2013 | Barton | H02G 3/32 416/146 R |
| 2015/0222106 A1* | 8/2015 | Caspari | H02G 3/32 174/651 |

\* cited by examiner

*Primary Examiner* — Hoa C Nguyen
*Assistant Examiner* — Amol Patel
(74) *Attorney, Agent, or Firm* — Dority & Manning, P.A.

(57) ABSTRACT

A cable positioning and securement system for use in a wind turbine includes an inner ring member configured to non-rotationally engage one or more cables extending from the nacelle into the wind turbine tower. An outer ring member is disposed concentric to the inner ring member. A bearing device is configured between the inner ring member and the outer ring member. One or more fixing devices extend radially from the outer ring member and attach to the tower. The fixing devices position the outer ring member at a defined non-rotational position within the tower, and the inner ring and engaged cable are able to rotate freely within the outer ring member.

16 Claims, 5 Drawing Sheets

WIND TURBINE TOWER CABLE POSITIONING DEVICE

FIELD OF THE INVENTION

The present disclosure relates generally to wind turbines, and more particularly to a device for positioning cables in the wind turbine tower that provides a degree of rotational freedom for the cables.

BACKGROUND OF THE INVENTION

Energy generated from wind through the use of large scale wind turbines has experienced rapid growth in recent years. Source of this growth may be the numerous environmental, technical and economic benefits related to wind generated energy production. Wind energy is widely available, renewable and reduces the production of greenhouse gases by diminishing the need of fossil fuels as energy source. Furthermore, improvements in design, manufacturing technologies, materials and power electronic devices of wind turbines has and will in the future continue to decrease production costs of wind turbines while increasing their energy production capabilities and efficiencies.

At least some known wind turbines include a tower and a nacelle mounted on the tower. A rotor is rotatably mounted to the nacelle and is coupled to generator by a shaft. A plurality of blades extend from the rotor. The blades are oriented such that wind passing over the blades turns the rotor and rotates the shaft, thereby driving the generators to generate electricity. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

The nacelle typically includes many power electronic devices that enable a controlled and efficient conversion of wind energy into electrical energy such as, for example, one or more generators, control and cooling systems, and so forth. The power and control cables for these devices, and well as the cables that feed electrical power into electrical supply grids, are routed from the nacelle into the tower where they initially hang free in a "drip loop" section of the tower in order to twist during rotation of the nacelle.

To maximize the energy production of a wind turbine, the nacelle is typically able to rotate or pivot versus the fixed position of the tower. This allows the rotor blades to be in an optimum position with respect to the wind direction. Equally, to avoid unfavorable wind gusts or extremely high wind speeds, the position of the nacelle may be adjusted accordingly. Based on this rotational movement of the nacelle, the cables in the drip loop section may be pulled together in a kind of uncontrolled "knurl", which is considered as an aggregation of at least one cable, for example, in the form of a cable knot that results from twist, strain, or writhe of the cable. Twisting forces of the nacelle may cause the cable to coil-up or super-coil and thus get pulled together, hence, usually shortening the relative length and broadening the relative width of the cable at the aggregation site. Generally, one twist is equivalent to one complete rotation of the cable around its longitudinal axis, hence one 360 degree rotation.

The twisting and curling behavior of the cables during operation of a wind turbine may lead to several disadvantageous issues, such as overheating in the knurls or movement of the knurls to other parts in the tower such as, for example, the ladder or lights. Further, the movement of the knurl may cause excessive wear of the cables or may damage surrounding structures. In the worst case, such uncontrolled movements of the cable knurls may result in entanglement of the cables inside of the tower that may eventually lead to system failure.

In a conventional configuration, a metal surrounds the cables in the drip loop section and is fixed to the tower wall via an elongated bracket. However, since the cables move vertically and laterally during operation of the wind turbine, this metal ring may cause abrasion of the cables.

Thus, it is appreciated in the industry that controlling the cable knurls is beneficial. To this end, U.S. Pat. No. 8,366,396 proposes a cable drip loop securement system that prevents knurl formations beyond a specified area of at least one cable that is routed from the nacelle into the tower. The securement system includes a displaceable cable drip loop securement device that accommodates part of the cable and a positioning element for connecting the cable loop securement device inside of the tower. The cable can turn and eventually form knurls only above the cable loop securement device.

Thus, the industry is continuously seeking improved systems and devices for controlling the cables from the nacelle in the tower that address at least certain of the issues noted above.

BRIEF DESCRIPTION OF THE INVENTION

Aspects and advantages of the invention will be set forth in part in the following description, or may be obvious from the description, or may be learned through practice of the invention.

In one aspect, the present invention is directed to a cable positioning and securement system for use in a wind turbine, wherein the wind turbine includes a nacelle supported atop a tower and at least one cable is routed from the nacelle into the tower. The system includes an inner ring member configured to non-rotationally engage the cable. This ring member may be variously configured, but generally defines a generally circular outer circumferential surface, with the cables secured by suitable means or devices within an interior portion of the ring member. An outer ring member is disposed concentric to the inner ring member, and a bearing device is disposed between the inner ring member and the outer ring member. The bearing device may be any manner or device or material that serves to allow rotation of the inner ring member relative to the outer ring member. In a particular embodiment, the bearing device is a roller bearing device. The system includes one or more fixing devices extending radially from the outer ring member and configured to attach to the tower. The fixing devices position the outer ring member at a defined non-rotational position within the tower while the inner ring and engaged cable are able to rotate freely within the outer ring member.

In one embodiment, the fixing devices are rigid members, such as bars, braces, or the like, that prevent lateral movement of the outer ring relative to the tower. Thus, sway of the cables within the tower is minimized. In certain other embodiments, a degree of lateral movement of the cables within the tower may be beneficial, and the fixing devices may be elastic devices, such as elastic chords, that permit lateral movement of the outer ring relative to the tower.

The fixing devices (rigid or elastic) may have a length to fix the outer ring at a central position within the tower.

As mentioned, the inner ring may be variously configured. In one embodiment, the inner ring member may comprise a cable clamp ring wherein the cables are clamped into recessed positions around a circumference of the clamp ring. To provide a smooth bearing surface (inner race), an outer sleeve may be configured around the circumference of the clamp ring. In an alternate embodiment, the recessed positions may be interior positions such that the outer circumferential surface of the clamp ring defines the inner bearing race.

The present invention also encompasses a wind turbine with a nacelle supported atop a tower, and at least one cable routed from the nacelle into the tower. The wind turbine includes a cable positioning and securement system according to any one of the embodiments discussed above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
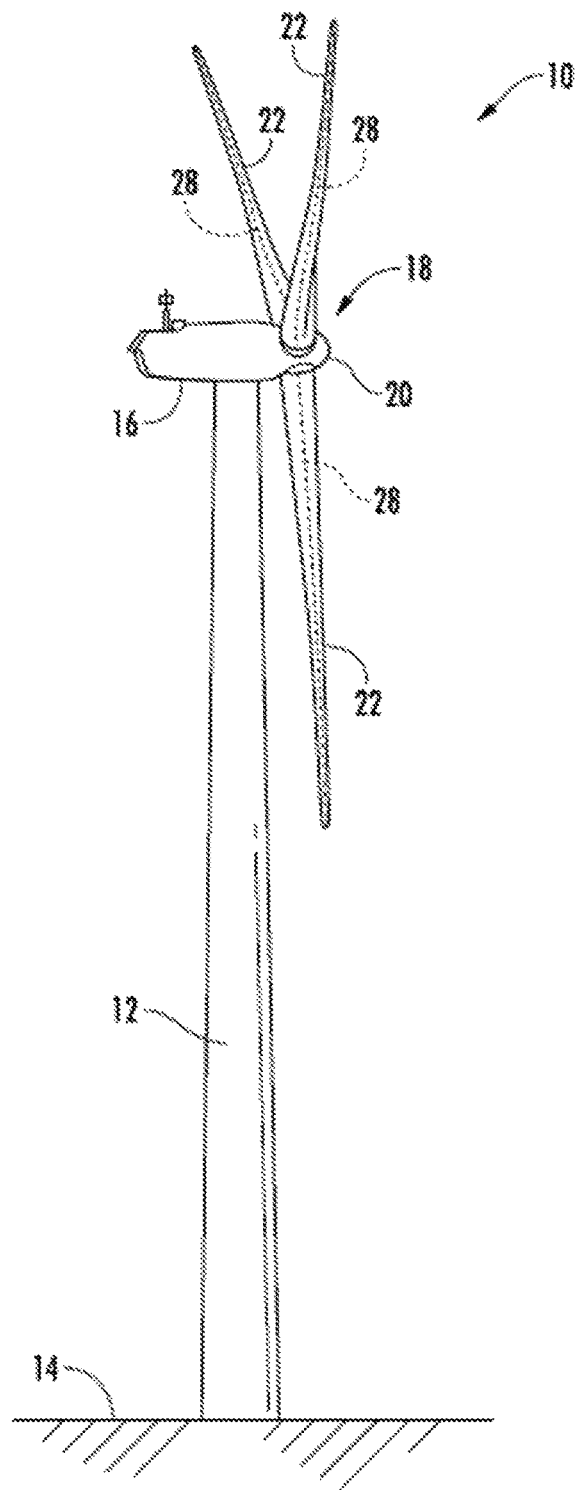
FIG. 1 is a perspective view of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 relevant to the present discussion. As shown, the wind turbine 10 generally includes a tower 12 extending from a support surface 14, a nacelle 16 (also referred to as a machine head) mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 (FIG. 2) centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components thereof. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals and/or performing the various method steps as described herein.

Figure 2:
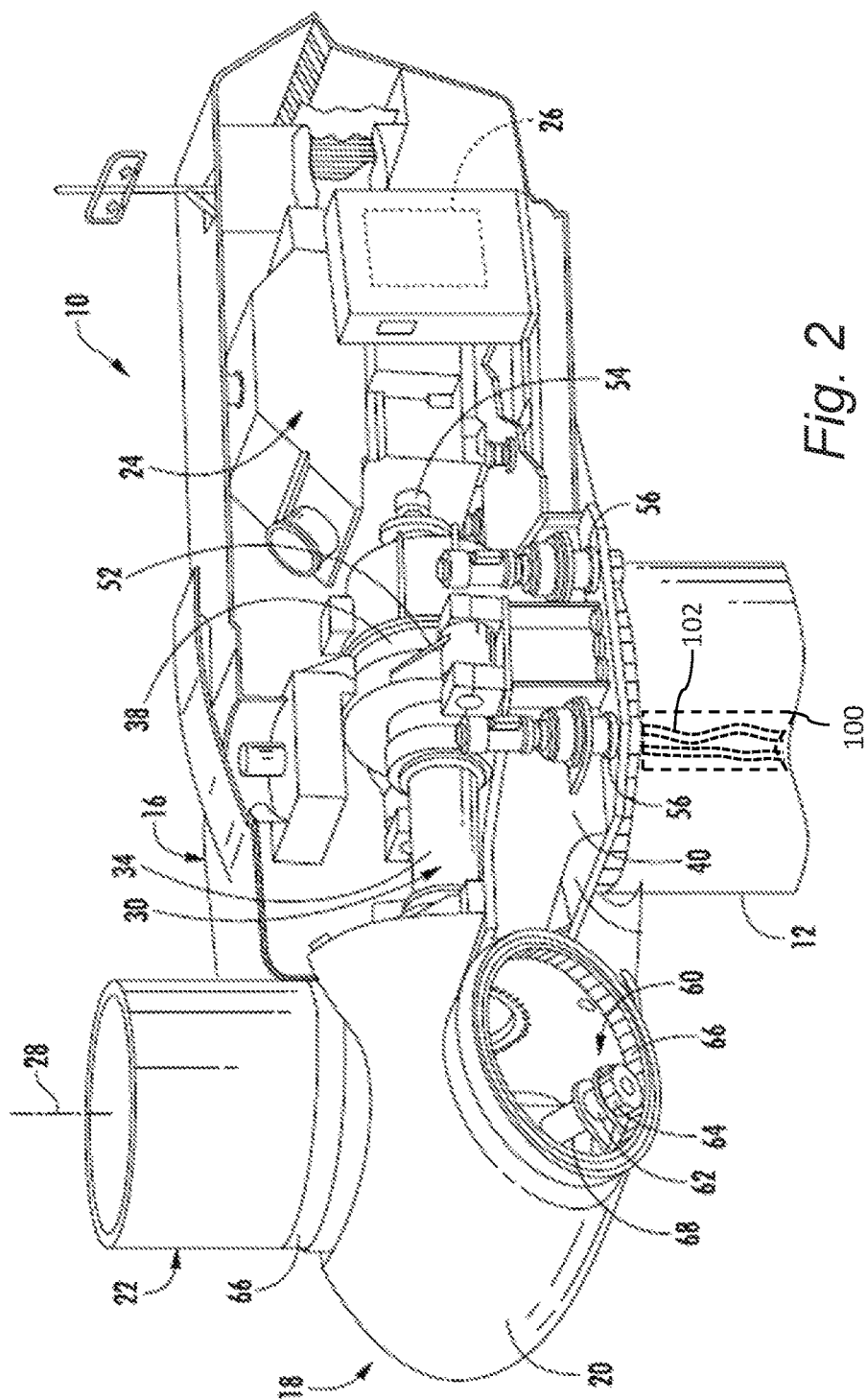
FIG. 2 is an enlarged sectional view of a portion of the wind turbine of FIG. 1 indicating the position of the present cable securement and positioning system.

Referring now to FIG. 2, a simplified, internal view of one embodiment of the nacelle 16 shown in FIG. 1 is illustrated, particularly illustrating the drivetrain assembly 30. As shown, the drivetrain assembly 30 includes the generator 24, which may be coupled to the rotor 18 for producing electrical power from the rotational energy generated by the rotor 18. The rotor 18 includes a main shaft 34 coupled to the hub 20 via a rotor flange for rotation therewith. The main shaft 34, in turn, is rotatably coupled to a generator shaft 54 of the generator 24 through a gearbox 38 connected to a bedplate support frame 40 by torque support arms 52.

As is generally understood, the main shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 60 configured to rotate each rotor blade 22 about its pitch axis 28. Further, each pitch adjustment mechanism 60 may include a pitch drive motor 68 (e.g., any suitable electric, hydraulic, or pneumatic motor), a pitch drive gearbox 62, and a pitch drive pinion 64. The pitch drive motor 68 is coupled to the pitch drive gearbox 62 to impart a mechanical force to the pitch drive gearbox 62. Similarly, the pitch drive gearbox 62 is coupled to the pitch drive pinion 64 for rotation therewith. The pitch drive pinion 64 is in rotational engagement with a pitch bearing 66 coupled between the hub 20 and a corresponding rotor blade 22 such that rotation of the pitch drive pinion 64 causes rotation of the pitch bearing 66, thereby rotating the rotor blade 22 about the pitch axis 28. Similarly, the wind turbine 10 may include one or more yaw drive mechanisms 56 communicatively coupled to the controller 26, with each yaw drive mechanism(s) 56 being configured to change the angle of the nacelle 16 relative to the wind (e.g., by engaging a yaw bearing 58 of the wind turbine 10).

FIG. 2 also schematically depicts a cable securement and positioning system 100 within the cable drip loop section of the tower 12 beneath the nacelle 16. Cables 102 from the nacelle 16 extend into the drip loop section. As used herein, the term "cable" is intended to be representative of any type of cable such as, for example, single- double- or triple-core power cables, radial field or collectively shielded power cables or any other conductive or non-conductive cables or cords that are routed from the nacelle to the tower of a wind turbine, for example, control cables.

Figure 3:
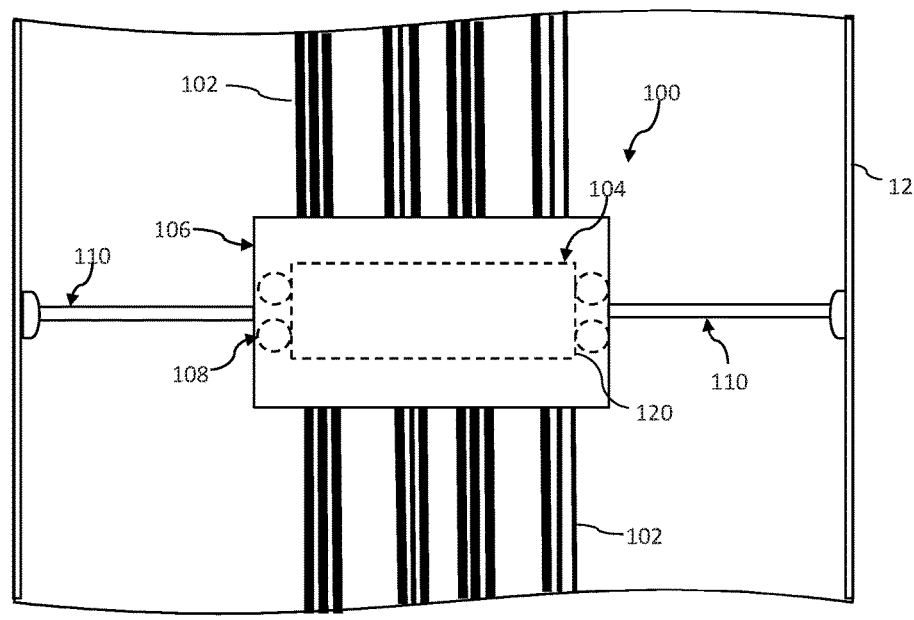
FIG. 3 is a schematic view of a portion of the wind turbine tower with an embodiment of the present cable securement and positioning system.
Figure 4:
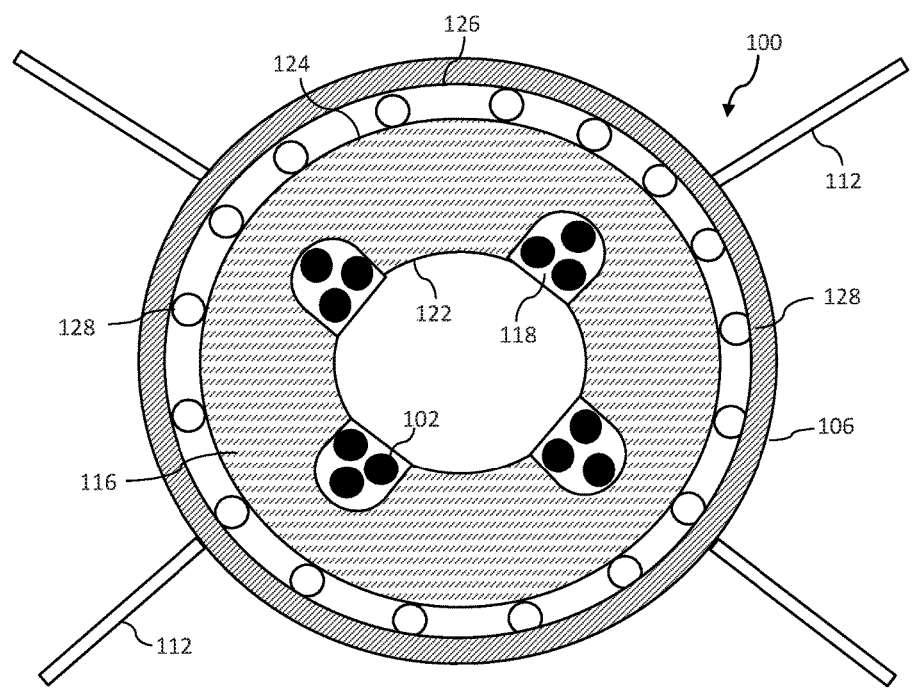
FIG. 4 is a schematic cross-sectional view of a portion of the wind turbine tower with an embodiment of the present cable securement and positioning system.

Referring to FIGS. 3 and 4, a particular embodiment is depicted of the system 100 for securing and positioning the cables 102 at a fixed location within the drip loop section of the tower 12. The system 100 includes an inner ring member 104 configured to non-rotationally engage the cables 102, thereby preventing the cables 102 from rotating within or relative to the inner ring member 104. The inner ring member 104 defines a generally circular outer circumferential surface 120 and can be variously configured with appropriate devices or means to secure one, a plurality, or bundles of cables 102 within an interior portion of the ring member 104. The ring member 104 can be made of any suitable material, such as metal or plastic.

An outer ring member 106 is disposed concentric to the inner ring member 104 with a concentric space between the ring members 104, 106. The outer ring member 106 has a generally circular inner circumferential surface 122, and can have any manner or shape of outer circumferential surface, for example a box or multi-sided shape. The circular outer surface of the outer ring member 106 is for illustrative purposes only.

A bearing device 108 is disposed between the inner ring member 104 and the outer ring member 106. The bearing device 108 may be any conventional bearing device or material that serves to allow rotation of the inner ring member 104 relative to the outer ring member 106. In the particular embodiment, the bearing device 108 is a roller bearing device 128 having a plurality of roller or ball-type bearings in the space between the inner and outer ring members 104, 106. Thus, with this arrangement, the outer circumferential surface 120 of the inner ring member 104 serves as an inner bearing race 124, and the inner circumferential surface 122 of the outer ring member 106 serves as an outer bearing race 126.

The system 100 includes one or more fixing devices 110 extending radially from the outer ring member 106 and configured to attach to the inner wall of the tower 12 via a bracket, brace, or other suitable mechanical attachment. The fixing devices 110 position the outer ring member 106 at a defined non-rotational position within the tower 12 while the inner ring 104 and engaged cables 102 are able to rotate freely within the outer ring member 106. In the embodiment depicted in FIGS. 4 and 5, the fixing devices 110 are rigid members 112, such as bars, rods, or the like, that prevent lateral movement of the outer ring 106 relative to the tower 12. The rigid devices 112 may have a length to fix the outer ring 106 at a central position within the tower. Thus, the cables 102 are held at a fixed generally central location within the tower 12, yet are free to rotate at this fixed central position while lateral sway of the cables 102 within the tower 12 is minimized.

Figure 6:
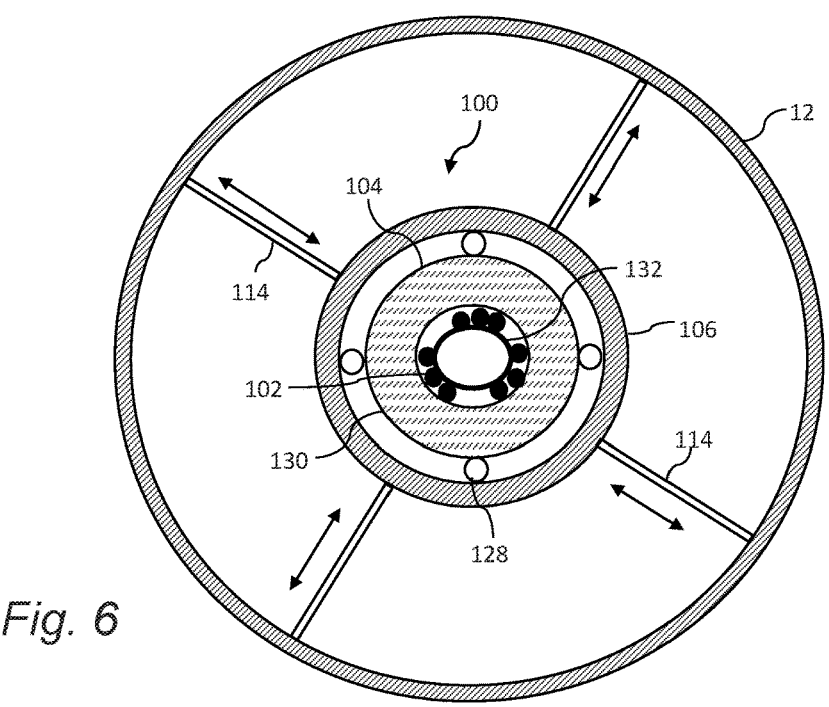
FIG. 6 is a schematic cross-sectional view of a portion of the wind turbine tower with still another embodiment of the present cable securement and positioning system.
Figure 7:
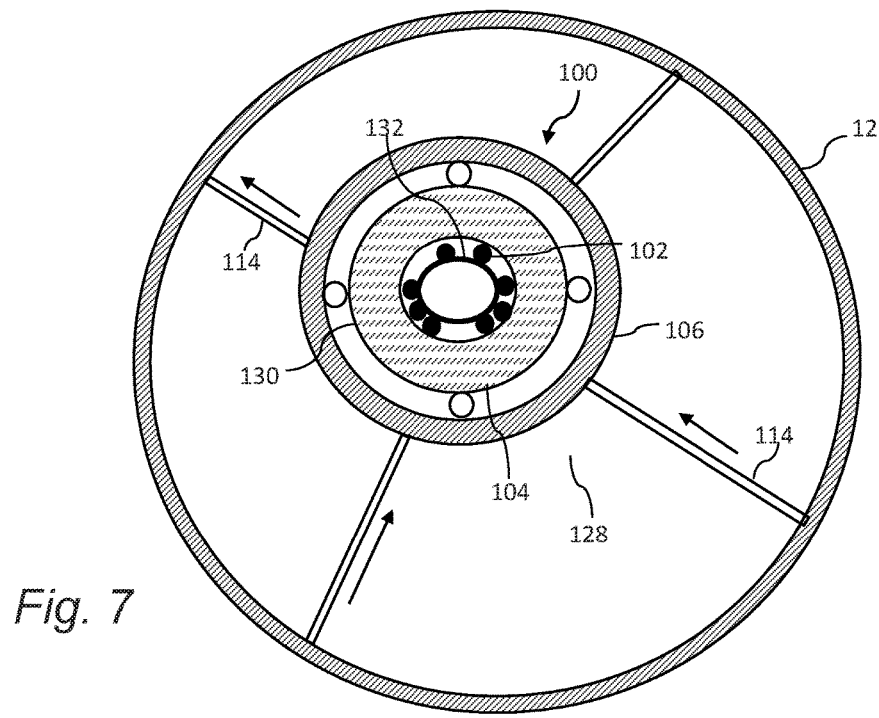
FIG. 7 is a schematic cross-sectional view of a portion of the wind turbine tower with the embodiment of the present cable securement and positioning system of FIG. 6 in a laterally shifted position within the tower.

Referring to FIGS. 6 and 7, in certain other embodiments, a degree of lateral movement of the cables 102 within the tower 12 may be beneficial, and the fixing devices 110 may be elastic devices 114, such as elastic chords, that permit lateral movement of the outer ring relative to the tower. FIG. 6 depicts the elastic devices 114 in a static tensioned state wherein the outer ring member 106 is at the central position within the tower 12. FIG. 7 depicts the same configuration with the outer ring member 106 displaced laterally within the tower 12, with certain of the elastic devices 114 retracted while others are stretched further.

As mentioned, the inner ring member 104 may be variously configured. In one embodiment, the inner ring member 104 may comprise a cable clamp ring 116 wherein the cables 102 are clamped into recessed positions 118 around a circumference of the clamp ring 116. For example, in the embodiment of FIG. 4, the recessed positions 118 may be interior positions such that the outer circumferential surface 120 of the clamp ring 116 defines the inner bearing race 124, as discussed above.

Figure 5:
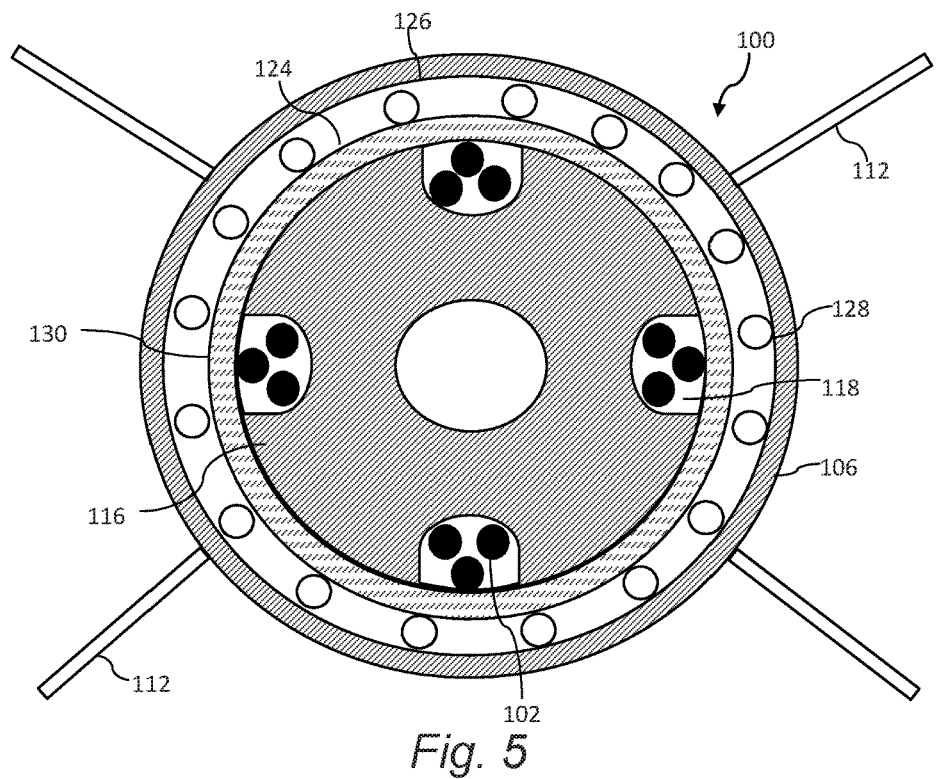
FIG. 5 is a schematic cross-sectional view of a portion of the wind turbine tower with another embodiment of the present cable securement and positioning system.

FIG. 5 depicts an embodiment wherein the recessed positions 118 in the clamp ring 116 are spaced around the outer circumference of the inner ring member 104. To provide a smooth bearing surface (inner race), an outer sleeve 130 may be configured around the circumference of the clamp ring 116 and also serve to retain the cables 102 within the recessed positions 118. In an alternate embodiment.

In the embodiment of FIGS. 6 and 7, the inner ring member 104 includes an inner sleeve 132 and concentric outer sleeve 130. Instead of recessed positions in the inner sleeve 132, the cables 102 are spaced around the inner sleeve 132. The outer sleeve 130 serves to securely wrap the cables 102 against the inner sleeve 132.

The present invention also encompasses a wind turbine 10 with a nacelle 16 supported atop a tower 12, and at least one cable 102 routed from the nacelle 16 into the tower 12. The wind turbine 10 includes a cable positioning and securement system 100 according to any one or combination of the embodiments discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cable positioning and securement system for use in a wind turbine, the wind turbine comprising a nacelle supported atop a tower, wherein at least one cable is routed from the nacelle into the tower, the system comprising:
   an inner ring member configured to non-rotationally engage the cable;
   an outer ring member disposed concentric to the inner ring member;
   a bearing device disposed between the inner ring member and the outer ring member;
   one or more fixing devices extending radially from the outer ring member and configured to attach to the tower at a fixed vertical position within the tower; and wherein the fixing devices position the outer ring member at a fixed vertical and non-rotational position within the tower, and the inner ring and engaged cable are able to rotate freely within the outer ring member.

2. The system as in claim 1, wherein the fixing devices are rigid members that prevent lateral movement of the outer ring relative to the tower.

3. The system as in claim 1, wherein a plurality of the fixing devices are circumferentially spaced around an outer circumference of the outer ring and have a length to fix the outer ring at a central position within the tower.

4. The system as in claim 1, wherein the inner ring member comprises a cable clamp ring.

5. The system as in claim 4, wherein the cable clamp ring comprises a plurality of circumferentially spaced recessed positions for receipt of one or more cables in each of the recessed portions, the recessed portions being non-rotationally configured in the clamp ring while the clamp ring is rotational relative to the outer ring.

6. The system as in claim 5, wherein the cable clamp ring comprises an outer circumferential surface that defines an inner race of the bearing device.

7. The system as in claim 6, wherein the bearing device comprises a roller bearing arrangement.

8. A cable positioning and securement system for use in a wind turbine, the wind turbine comprising a nacelle supported atop a tower, wherein at least one cable is routed from the nacelle into the tower, the system comprising:
   an inner ring member configured to non-rotationally engage the cable;
   an outer ring member disposed concentric to the inner ring member;
   a bearing device disposed between the inner ring member and the outer ring member;
   one or more fixing devices extending radially from the outer ring member and configured to attach to the tower;
   wherein the fixing devices position the outer ring member at a defined non-rotational position within the tower, and the inner ring and engaged cable are able to rotate freely within the outer ring member; and
   wherein the fixing devices are elastic devices that permit lateral movement of the outer ring relative to the tower.

9. The system as in claim 8, wherein the elastic devices comprise elastic chords.

10. A wind turbine, comprising:
    a nacelle supported atop a tower;
    at least one cable routed from the nacelle into the tower;
    a cable positioning and securement system configured within the tower, comprising
    an inner ring member non-rotationally engage with the cable;
    an outer ring member disposed concentric to the inner ring member;
    a bearing device disposed between the inner ring member and the outer ring member;
    one or more fixing devices extending radially from the outer ring member and configured to attach to the tower at a fixed vertical position within the tower; and
    wherein the fixing devices position the outer ring member at a fixed vertical and non-rotational position within the tower, and the inner ring and engaged cable are able to rotate freely within the outer ring member.

11. The wind turbine as in claim 10, wherein the fixing devices are rigid members that prevent lateral movement of the outer ring relative to the tower.

12. A wind turbine, comprising:
    a nacelle supported atop a tower;
    at least one cable routed from the nacelle into the tower;
    a cable positioning and securement system configured within the tower, comprising
    an inner ring member non-rotationally engage with the cable;
    an outer ring member disposed concentric to the inner ring member;
    a bearing device disposed between the inner ring member and the outer ring member;
    one or more fixing devices extending radially from the outer ring member and attached to the tower;
    wherein the fixing devices position the outer ring member at a defined non-rotational position within the tower, and the inner ring and engaged cable are able to rotate freely within the outer ring member; and
    wherein the fixing devices are elastic devices that permit lateral movement of the outer ring relative to the tower.

13. The wind turbine as in claim 12, wherein the inner ring member comprises a cable clamp ring.

14. The wind turbine as in claim 13, wherein the cable clamp ring comprises a plurality of circumferentially spaced recessed positions for receipt of one or more cables in each of the recessed portions, the recessed portions being non-rotationally configured in the clamp ring while the clamp ring is rotational relative to the outer ring.

15. The wind turbine as in claim 14, wherein the cable clamp ring comprises an outer circumferential surface that defines an inner race of the bearing device.

16. The wind turbine as in claim 15, wherein the bearing device comprises a roller bearing arrangement.

* * * * *